United States Patent [19]
Dettmer

[11] 3,712,134
[45] Jan. 23, 1973

[54] VARIABLE AREA FLOWMETER

[75] Inventor: Hans Juergen Dettmer, 3400 Goettingen, Germany

[73] Assignee: Fischer & Porter Company, Warminster, Pa.

[22] Filed: March 9, 1971

[21] Appl. No.: 122,378

[30] Foreign Application Priority Data

April 6, 1970 Germany.....................P 70 12 517.6
April 6, 1970 Germany.....................P 20 16 329.5

[52] U.S. Cl. .................................................73/209
[51] Int. Cl. ..............................................G01f 1/00
[58] Field of Search................................73/209, 323

[56] References Cited

UNITED STATES PATENTS 3,342,068  9/1967  Metzger ................................73/209
3,232,107  2/1966  Busillo..................................73/209

*Primary Examiner*—James J. Gill
*Attorney*—Michael Ebert

[57] ABSTRACT

A variable-area flowmeter in which the meter tube is removably supported on a lower inlet fitting and an upper outlet fitting projecting forwardly from a mounting plate. The meter tube is provided with lateral openings adjacent the lower and upper ends thereof, which openings register respectively with the inlet and outlet fittings and are dimensioned to snugly accommodate these fittings. Extending longitudinally within the tube between the lateral openings is a tapered bore having a float therein. The inlet end of the bore is aligned with a port in the inlet fitting leading to an inlet passage, whereas the outlet end of the bore is aligned with a port in the outlet fitting leading to an outlet passage, whereby fluid introduced through the inlet fitting and passing through the bore into the outlet fitting causes the float to rise to a level determined by fluid flow rate. The meter tube may be removed simply by sliding it off the fittings, which are provided with O-rings sealably to engage the walls of the lateral openings.

6 Claims, 3 Drawing Figures

PATENTED JAN 23 1973
3,712,134
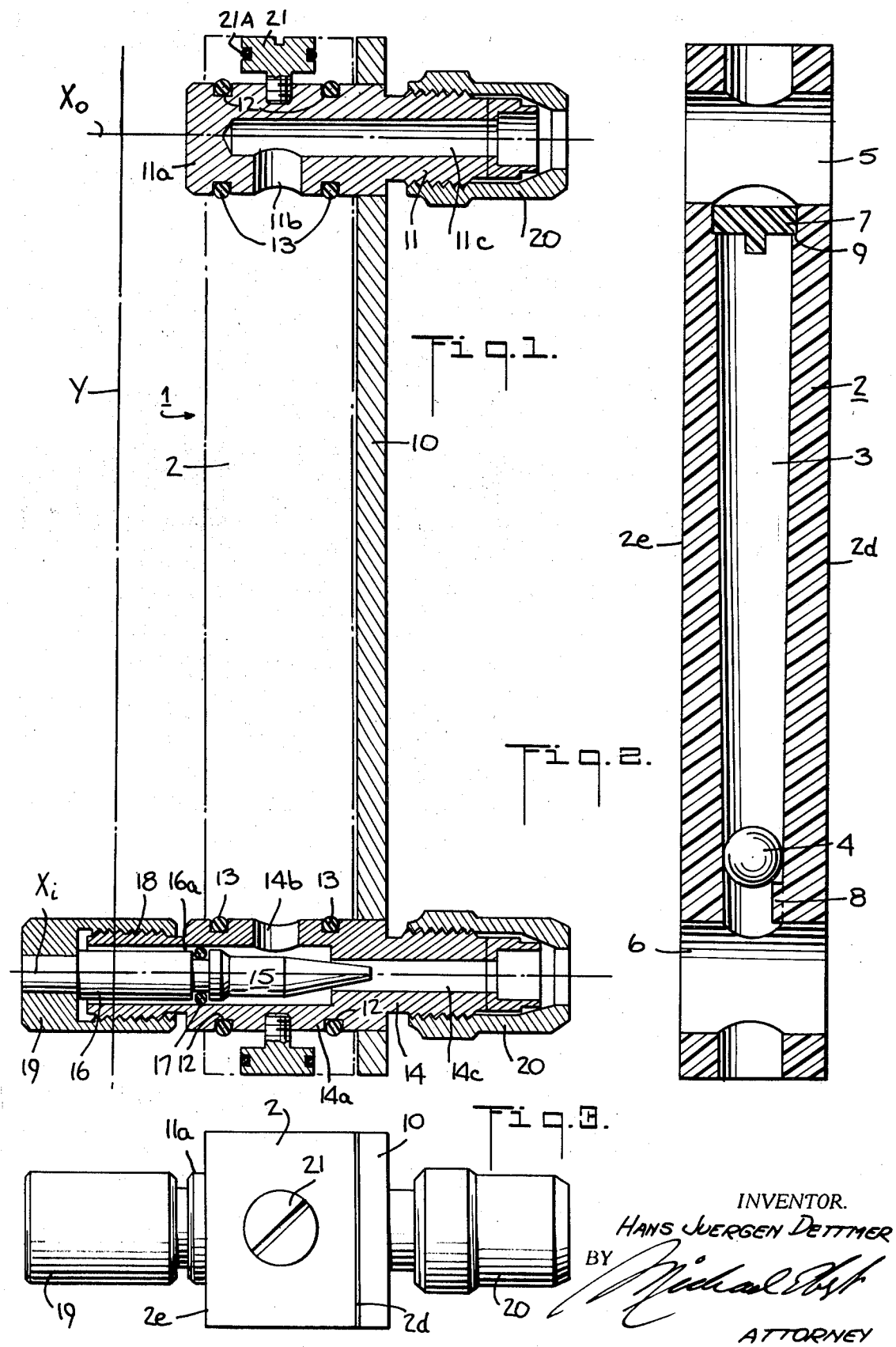
INVENTOR.
HANS JUERGEN DETTMER
BY
ATTORNEY

_3,712,134_

VARIABLE AREA FLOWMETER

BACKGROUND OF THE INVENTION

This invention relates generally to a flowmeter of the rotometer type having a variable-area tube, and more particularly to a rotometer in which the meter tube may be readily removed without disassembling the flowmeter.

In the usual type of rotometer, a weighted float contained in an upright tapered tube is raised to a position of equilibrium between the downward force of the float and the upward force of the fluid flowing past the float through the annular orifice surrounding the float. The term "rotometer" was derived from the fact that floats originally had slots therein to impart a rotational force for the purpose of centering and stabilizing the float. The present trend, however, is toward guided, non-rotating floats.

In one well-known commercial form of rotometer, such as that disclosed in the U.S. Pat. No. 3,342,068, in lieu of a tapered tube, the flowmeter is provided with a tube having a tapered bore affording a variable cross-sectional area. The float disposed in the bore assumes a vertical position depending on the rate of fluid flow, which may be liquid or gas. The vertical position of the float is indicated along a calibrated scale on the front of the tube.

With a variable-area flowmeter, one must be able to remove the meter tube in order to clean it as well as to facilitate inspection and replacement of parts. Moreover, one may also wish to replace a meter tube of a given bore size with another tube having a different bore size to afford a different measurement range. Since the flowmeter components, with the exception of the tubes, are otherwise the same, it is more economical, when a different metering scale is required, to merely replace the tube rather than to provide a second flowmeter in which all components, except for the tube, duplicate those of the first flowmeter.

With existing flowmeter designs, the ability to remove a meter tube and to replace the tube with another tube of the same length but of a different range is complicated by the fact that to carry out this operation, the meter must be at least partially dismantled. This is undesirable from the practical standpoint, for it involves not only time, but some degree of skill and care as well as the use of special tools.

In German Pat. DAS 1,155,260, there is disclosed a variable-area flowmeter wherein the meter tube may be removed and replaced without having to dismantle the instrument. In this patent, fittings are provided which are aligned with the longitudinal axis of the meter tube, the tube having a circular cross-section. The meter tube is held between cylindrical supports, the tube being sealed thereto by O-rings disposed in annular grooves at the ends of the tube. The meter tube supports are provided at their outer circumference with O-rings to effect a seal with the fittings surrounding the supports. One of the meter tube supports is securely held in its associated fitting, whereas the other support is longitudinally movable relative to its fitting, the movable support being spring-biased whereby it presses against the related end of the meter tube, thereby holding the meter tube fast between both fittings.

The arrangement disclosed in the above-identified German patent makes it possible to readily exchange meter tubes, for all that need be done is to press the tube axially against the spring-biased support, thereby decoupling the tube from the fixed support, the tube then being swung outwardly to remove it from the instrument.

The ability to exchange meter tubes which characterizes the arrangement in the German patent is at the expense of a more complicated supporting structure, and also involves the use of springs. Moreover, in this arrangement the meter tube is subjected to a bending strain by reason of the spring tension, and this requires more expensive material for the tube in the form of a special glass capable of withstanding the strain.

SUMMARY OF THE INVENTION

In view of the foregoing, it is the main object of this invention to provide a variable-area flowmeter having simple fittings and meter tube supports so arranged that the meter tube may readily be withdrawn and replaced without the need for springs and without subjecting the meter tube to bending strains.

More specifically, it is an object of the invention to provide a flowmeter of the above type, wherein the inlet and outlet fittings of the flowmeter are arranged in parallel relation, the axes thereof lying in a common vertical plane, the meter tube having lateral openings therein which register with said fittings, whereby said meter tube may be simply and safely installed on said fittings or removed therefrom by a sliding motion without obstruction from other parts of the instrument.

Also an object of the invention is to provide a variable-area flowmeter of the above type in which the fittings project forwardly from a plate serving as a mounting stop or support for the meter tube installed on the fittings.

Still another object of the invention is to provide a variable-area flowmeter which permits the use of inexpensive materials for the meter tube, and which may be manufactured and sold at low cost.

Briefly stated, these objects are accomplished in a variable-area flowmeter including a meter tube of rectangular or square cross-section, the tube having lateral openings adjacent the opposing ends thereof and a tapered bore extending longitudinally in the tube between these openings. A float is accomodated within the bore and is movable therein within limits established by a lower stop and an upper stop.

Also provided is a lower inlet fitting and an upper outlet fitting projecting forwardly from a mounting plate, the fittings being disposed in parallel relation with their axes lying in a common vertical plane. The dimensions of the fittings and their placement are such that they are snugly received within the lateral openings of the meter tube. The inlet fitting includes an internal passage communicating with a port aligned with the inlet end of the variable-area bore, and the outlet fitting includes an internal passage communicating with a port aligned with the outlet end of the bore, whereby when a tube is mounted on the fittings it is supported thereby and is operatively associated therewith, the tube being removed simply by slidably withdrawing it from the fittings.

OUTLINE OF THE DRAWING

For a better understanding of the invention, as well as other objects and further features thereof, reference is made to the following detailed description to be read in conjunction with the accompanying drawing, wherein:

FIG. 1 is a longitudinal section taken through a variable-area flowmeter in accordance with the invention, the outline of the meter tube being shown in broken lines;

FIG. 2 is a longitudinal section taken through the meter tube, which is shown removed from the instrument; and FIG. 3 is a plan view of the instrument.

DESCRIPTION OF THE INVENTION

Referring now to the drawing, a variable-area flowmeter 1 is illustrated, the instrument including a meter tube 2 of rectangular cross-section having a tapered bore 3 therein to accomodate a float 4. Bore 3 extends longitudinally between lateral openings 5 and 6 adjacent the upper and lower ends, respectively, of the meter tube. Openings 5 and 6 are cylindrical in form, and lie in parallel relation, opening 5 communicating with the outlet end of bore 3 and opening 6 communicating with the inlet end thereof.

Float 4, which may consist of a spherical ball of stainless steel or other non-corrodable material, is raised in the bore to a level determined by fluid flow rate, the movement of the float being limited by a lower stop 8 integral with the tube, and an upper stop 7 which rests on shoulder 9 and is removable therefrom. The bore may be cleaned by means of a flexible pipe cleaner or similar means. To effect cleaning, upper float stop 7 is removed and the cleaning brush is introduced through lateral opening 5.

The meter tube 1 is removably mounted on upper and lower fittings, generally designated by numerals 11 and 14, which fittings are supported on and project forwardly from a mounting plate 10. It will be seen that the axis $X_o$ of the outlet fitting 11 is in parallel relationship to the axis $X_i$ of the inlet fitting 14, the two axes lying within a common vertical plane Y. Thus, when the meter tube is mounted on the fittings it is vertically oriented.

Fittings 11 and 14 are of generally cylindrical form, the forward sections 11a and 14a thereof entering lateral openings 5 and 6 when the meter tube is mounted thereon. The external diameter of the fittings is slightly smaller than the internal diameter of the openings so that the fittings are snugly received. To effect a fluid seal between the fittings and the openings, each fitting is provided with a pair of spaced annular grooves 12 having resilient O-rings 13 inserted therein. These O-rings engage the walls of the openings to provide the desired seal and at the same time prevent physical displacement of the tube so that the installed tube is held in place without screws or other means.

The rear sections of fittings 11 and 14 extending behind mounting plate 10 are provided with union screws 20, so that inlet fitting 14 may be coupled to an inlet pipe, and outlet fitting 11, to an outlet pipe. Fluid introduced into inlet fitting 14 flows through inlet passage 14c which communicates with the inlet end of bore 3 in the meter tube through port 14b in the fitting which is aligned therewith. Fluid from the outlet end of bore 3 goes into port 11b aligned therewith and from there into outlet passage 11c in outlet fitting 11. It will be seen that the O-rings 13 are placed on either side of the ports in the fittings, whereby leakage is altogether prevented.

Lower fitting 14 is provided with a needle valve 15 whose valve plug is adapted to engage a valve seat in passage 14c to close the passage. Valve 15 is operated by rotating a stem 16 extending forwardly from the fitting and coupled to a cylindrical knob 19 which is rotatable on the externally threaded section 18 of the fitting. Stem 16 is provided with a groove 16a having an O-ring 17 therein to seal the fluid passage. Thus when knob 19 is turned in one direction, the valve plug 15 is withdrawn from the seat, and fluid is permitted to enter the meter-tube bore 3 through port 14b to an extent determined by the knob setting.

It is important to note that the external diameter of knob 19 is no greater than that of the forwardly projecting section 14a of the inlet fitting, so that meter tube 1 may be installed on both fittings or removed therefrom without having to first remove the needle valve from the inlet fitting.

The front face 2e of the meter tube 2, which is exposed, is equipped with a calibrated scale (not shown). One may also, in certain circumstances, advantageously apply scales to the exposed side surfaces of the tube. In its operating position, meter tube 2 is mounted so that its flat rear face 2d lies directly against the flat surface of mounting plate 10 or against mounting stops placed on this plate. To prevent unauthorized removal of the meter tube, the tube may be locked to the mounting plate by means of suitable brackets or clamps.

Since the meter tube is not subjected to bending forces, it may be made of a low-cost transparent plastic material, using die-casting or similar techniques for this purpose. One may also, if preferred make the tube of borosilicate glass with a precision-molded tapered bore. Where the two fittings have the same diameter, either one may be used in the inlet or in the outlet of the pipe line.

The rearwardly projecting sections of fittings 11 and 14 are provided with union screws 20 for connection to the pipe line. In order to prevent the fittings from turning when making connections, and also to seal the end openings in the lower and upper ends of meter tube 1, screws 21 and 22 are provided which are received in the end openings of the meter tube and enter threaded bores in the fittings. The heads of screws 21 and 22 are provided with O-rings 21A and 22A, respectively.

While there has been shown and described a preferred embodiment of a variable-area flowmeter in accordance with the invention, it will be appreciated that many changes and modifications may be made therein without, however, departing from the essential spirit thereof.

I claim:

1. A variable-area flowmeter comprising:
   A. a meter tube having lower and upper lateral openings adjacent the ends thereof and a tapered bore extending longitudinally between the openings, said bore having a float therein, and B. upper and lower fittings, the axes of said fittings being disposed in parallel relation and lying in a common vertical plane, said fittings registering with said openings, the front portions of said fittings having substantially the same cross-sectional dimensions as the related openings to render said tube slidable onto the front portions of said fittings, whereby said tube is removably supported thereby, said fittings each having an internal fluid passage leading to a port in alignment with the related end of the meter-tube bore whereby fluid admitted into the bore through the inlet fitting and passing out of the outlet fitting causes the float to rise to a level determined by fluid flow rate.

2. A flowmeter as set forth in claim 1, further including O-rings mounted on the front portions of said fittings to engage the surface of said openings to seal said tube.

3. A flowmeter as set forth in claim 1, wherein one of said fittings further includes a needle valve whose control knob protrudes forwardly from the front portion thereof and has a diameter which is no greater than that of the front portion of the associated fitting, whereby said knob is admissible through the related opening.

4. A flowmeter as set forth in claim 1, wherein said fittings are supported on a mounting plate, and the front portions of the fittings project forwardly from the plate.

5. A flowmeter as set forth in claim 4, wherein said tube has a rectangular cross-section, the rear of the tube lying against the mounting plate.

6. A flowmeter as set forth in claim 1, wherein said tube includes a fixed stop at the lower end of the bore and a removable stop at the upper end thereof.

* * * * *